United States Patent [19]
Dauvillier

[11] Patent Number: 5,895,202
[45] Date of Patent: Apr. 20, 1999

[54] MOLECULAR DRAG PUMP

[75] Inventor: Olivier Dauvillier, Annecy, France

[73] Assignee: Alcatel CIT, Paris, France

[21] Appl. No.: 08/665,095

[22] Filed: Jun. 14, 1996

[30] Foreign Application Priority Data

Jun. 16, 1995 [FR] France .................. 95 07213

[51] Int. Cl.⁶ ............................................. F01D 1/36
[52] U.S. Cl. ............................ 415/90; 415/229
[58] Field of Search ............................ 415/90, 229

[56] References Cited

U.S. PATENT DOCUMENTS 4,893,985 1/1990 Holss .............................. 415/90

FOREIGN PATENT DOCUMENTS

| 0220581A1 | 5/1987 | European Pat. Off. . |
| 2942008A1 | 4/1981 | Germany . |
| 61-132797 | 6/1986 | Japan .................................. 415/90 |
| 1331166 | 9/1973 | United Kingdom . |

*Primary Examiner*—John Kwon
*Attorney, Agent, or Firm*—Sughrue, Mion, Zinn, Macpeak & Seas, PLLC

[57] ABSTRACT

A molecular drag pump including a stator and a rotor supported in the stator using two ball bearings at least one of which presses against at least one bearing surface of the stator serving as an axial abutment for the rotor, wherein the contact between the ball bearing and the bearing surface operates in bending and not in shear.

6 Claims, 1 Drawing Sheet

MOLECULAR DRAG PUMP

BACKGROUND OF THE INVENTION

The term "molecular drag pump" is used to mean a rotary mechanical pump having fins or of the Holweck type or a combination of both.

In numerous applications, in particular in the field of instrumentation, molecular drag pumps must have a very low level of vibration.

It is known to provide radial vibratory isolation by means of an elastomer O-ring disposed around ball bearings.

In the axial direction, at least one of the ball bearings presses against a shoulder of the stator, with this contact serving as an axial positioning reference determining axial clearances between the rotor and the stator. The contact shoulder operates in shear under the effect of an axial load. Unfortunately, the oscillating system constituted by the rotor pressing against the shoulder via the ball bearings is very stiff, so its resonant oscillation frequency is in the range of nominal speeds of rotation for pumps.

OBJECTS AND SUMMARY OF THE INVENTION

An object of the present invention is to provide a pump having smaller axial stiffness so that the resonant frequency of axial oscillation of the rotor corresponds to a speed of rotation of the rotor that is much lower than its nominal speed of rotation.

The invention thus provides a molecular drag pump comprising a stator and a rotor supported in the stator by means of two ball bearings, at least one of which presses against at least one bearing surface of the stator serving as an axial abutment for the rotor, wherein the contact between the ball bearing and the bearing surface operates in bending and not in shear.

This provides good vibratory isolation of the rotor in an axial direction while nevertheless providing contact that is sufficiently stiff to serve as an axial reference for the axial clearances between the rotor and the stator, which would not be the case with contact provided by an elastomer washer.

This contact bearing surface can constitute a single circular bearing surface or it may be constituted by a plurality of bearing surfaces, e.g. three, each constituting a beam primarily in bending.

BRIEF DESCRIPTION OF THE DRAWING

An embodiment of the invention is described below with reference to the accompanying drawing, in which.

MORE DETAILED DESCRIPTION

Figure 1:
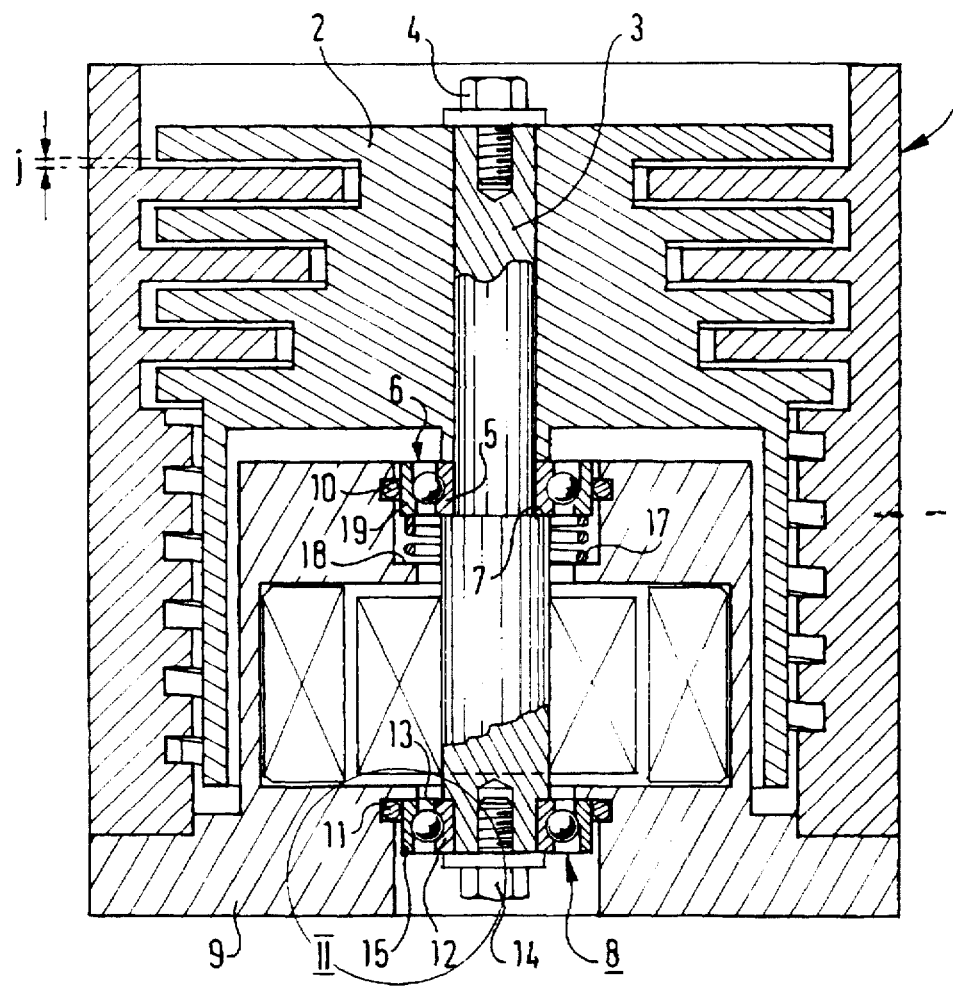
FIG. 1 shows a molecular drag pump of the invention.

With reference to the figures, the molecular drag pump comprises a stator 1 and a rotor 2. The rotor 2 is secured to a shaft 3 by a clamping screw 4 that clamps the rotor 2 and the inner ring 5 of a first ball bearing 6 against a shoulder 7 of the shaft 3.

The rotor 2 is supported in the stator 1 by the first ball bearing 6 and by a second ball bearing 8 mounted in the internal portion 9 of the stator 1 via respective antivibratory rotor gaskets: 10 for the ball bearing 6 and 11 for the ball bearing 8. These gaskets 10 and 11 are made of elastomer and provide radial vibratory isolation for the rotor 2 within the stator 1. The inner ring 12 of the ball bearing 8 is clamped against a shoulder 13 of the shaft 3 by a clamping screw 14. The axial positioning reference of the rotor 2 in the stator 1 is given by contact between the outer ring 15 of the bearing 8 against a bearing member 16 of the portion 9 of the stator 1 via a pre-loading spring 17 pressing firstly against a bearing surface 18 of the stator and secondly against the outer ring 19 of the ball bearing 6, thereby urging the entire rotor upwards until the outer ring 15 of the ball bearing 8 comes into contact with the bottom surface of the bearing member 16.

Figure 2:
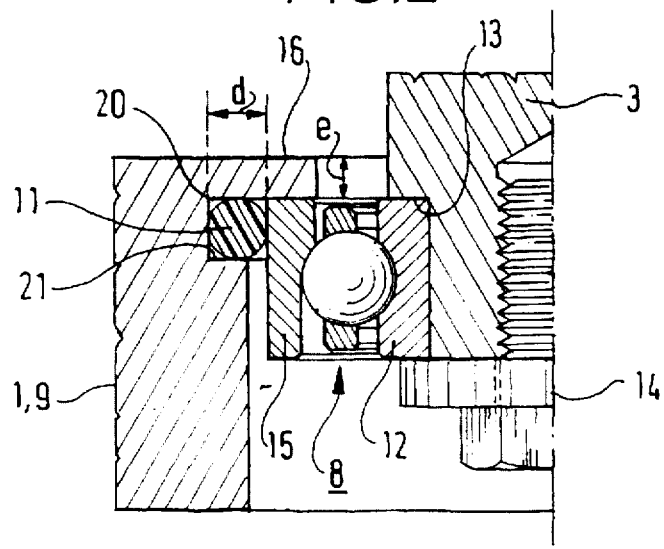
FIG. 2 shows a detail of FIG. 1 on a larger scale.

According to the invention, and as can be seen clearly in FIG. 2, the contact between the outer ring 15 of the ball bearing 8 and the bearing member 16 gives rise primarily to a bending stress as opposed to a shear stress.

The ring 15 does not press against the bearing member 16 at the root thereof, at 20; but only at a certain distance d from the root, thereby allowing the bearing member to act in bending.

Advantage is taken of this structure to place the antivibration gasket 11 against said bearing member 16 in a groove 21 formed thereagainst. The depth of the groove naturally contributes to the "cantilever" effect of the bearing member 16. Naturally, it is advantageous to take advantage of the bearing member 16 and place the gasket in this location, but that is not essential and the gasket could be placed further down on the outer ring 15.

The bearing member 16 is a single circular surface, but it would also be very easy to build it up from a plurality of contact surfaces each constituting a kind of beam, e.g. three beams, all operating in bending.

By way of example, the following values can be given:

Pump rotor, overall mass including the shaft: 250 g.

Nominal speed of rotation: 60,000 revolutions per minute.

The bearing member 16 is a single circular bearing member of inside diameter equal to 13 mm, with the distance d being equal to 7 mm and the thickness e of said bearing surface being 0.7 mm.

The resonant frequency in axial vibration is situated at a speed of rotation of 30,000 revolutions per minute.

The axial stiffness of the assembly is $2.5 \times 10^6$ N/m.

This stiffness is sufficient to ensure axial clearances j=0.3 mm between the stator and rotor fins.

I claim:

1. A drag pump, comprising:

a stator including a bearing member;

a rotor;

a pair of bearings for rotatably supporting said rotor with respect to said stator, a first one of said bearings including an inner ring, an outer ring contacting said bearing member, and opposite end faces, only one of said end faces pressing against said stator by contacting said bearing member for axially positioning said rotor, wherein said bearing member extends radially inwardly from a root portion thereof so as to be contacted by said outer ring and said contact causes said bearing member to experience primarily a bending stress, and wherein a ratio of d/e is approximately 10, where:

d is a distance from said root portion to said outer ring; and e is thickness of said bearing in an axial direction of said rotor.

2. The drag pump of claim 1, wherein said bearing member is circular.

3. The drag pump of claim 1, wherein said distance d is approximately 7 mm.

4. A drag pump comprising:

a stator including a plurality of contacting bearing members and a groove formed in said stator at a root portion of said bearing member;

a rotor;

a plurality of bearings for supporting said rotor in said stator, at least one of which presses against said plurality of contacting bearing members of the stator serving as an axial abutment for the rotor; and a rotor gasket disposed in said groove and contacting both said bearing member and said bearings, said gasket positioning said bearings at a distance from said root portion of said bearing members wherein the contact between said ball bearing and said bearing members causes said bearing members to experience more bending stress than any other type of stress.

5. A molecular drag pump according to claim 4, wherein each of said bearing members comprises a beam.

6. A drag pump, comprising:

a stator including a bearing member and a groove formed in said stator at a root portion of said bearing member;

a rotor;

a plurality of bearings for rotatably supporting said rotor with respect to said stator, a first one of said bearings including opposite end faces, only one of said end faces pressing against said stator by contacting said bearing member for axially positioning said rotor; and a rotor gasket disposed in said groove and contacting both said bearing member and said bearings, said gasket positioning said first one of said bearings at a distance from said root portion of said bearing members wherein the contact between said bearing end face and said bearing member causes said bearing member to experience more bending stress than any other type of stress.

* * * * *